Patented Nov. 2, 1937

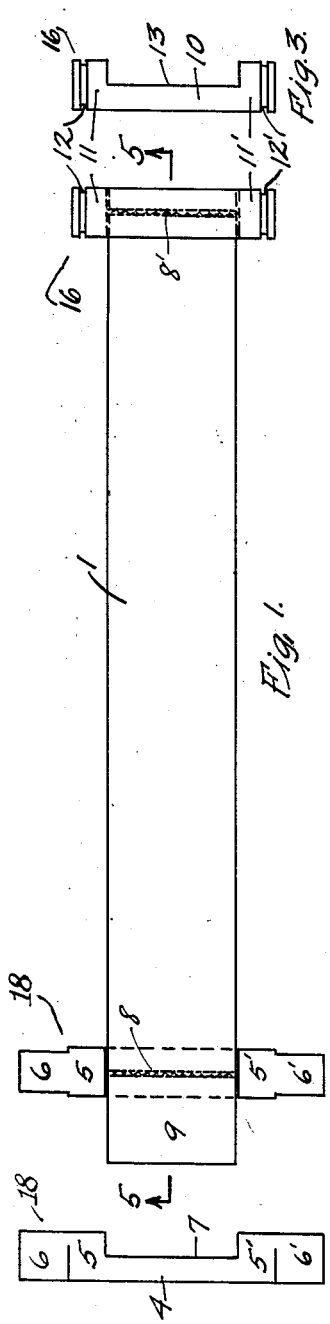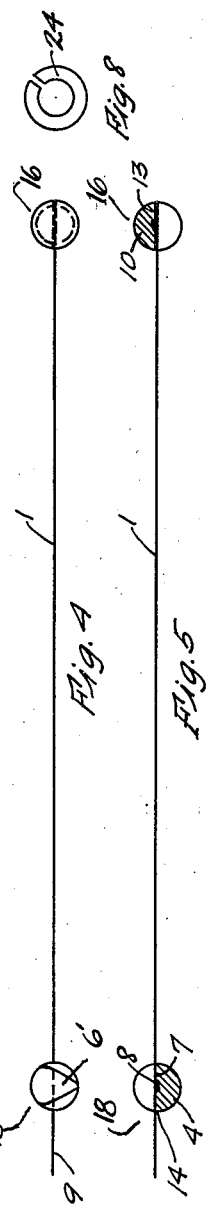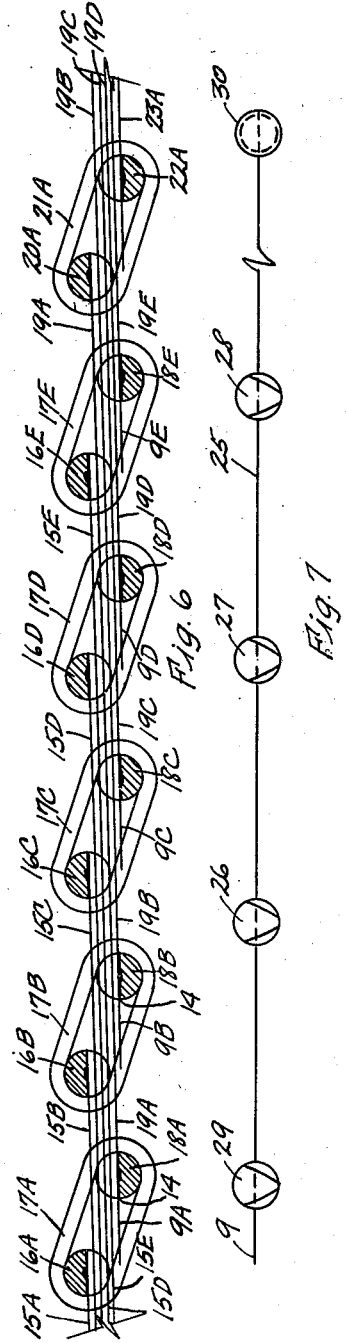

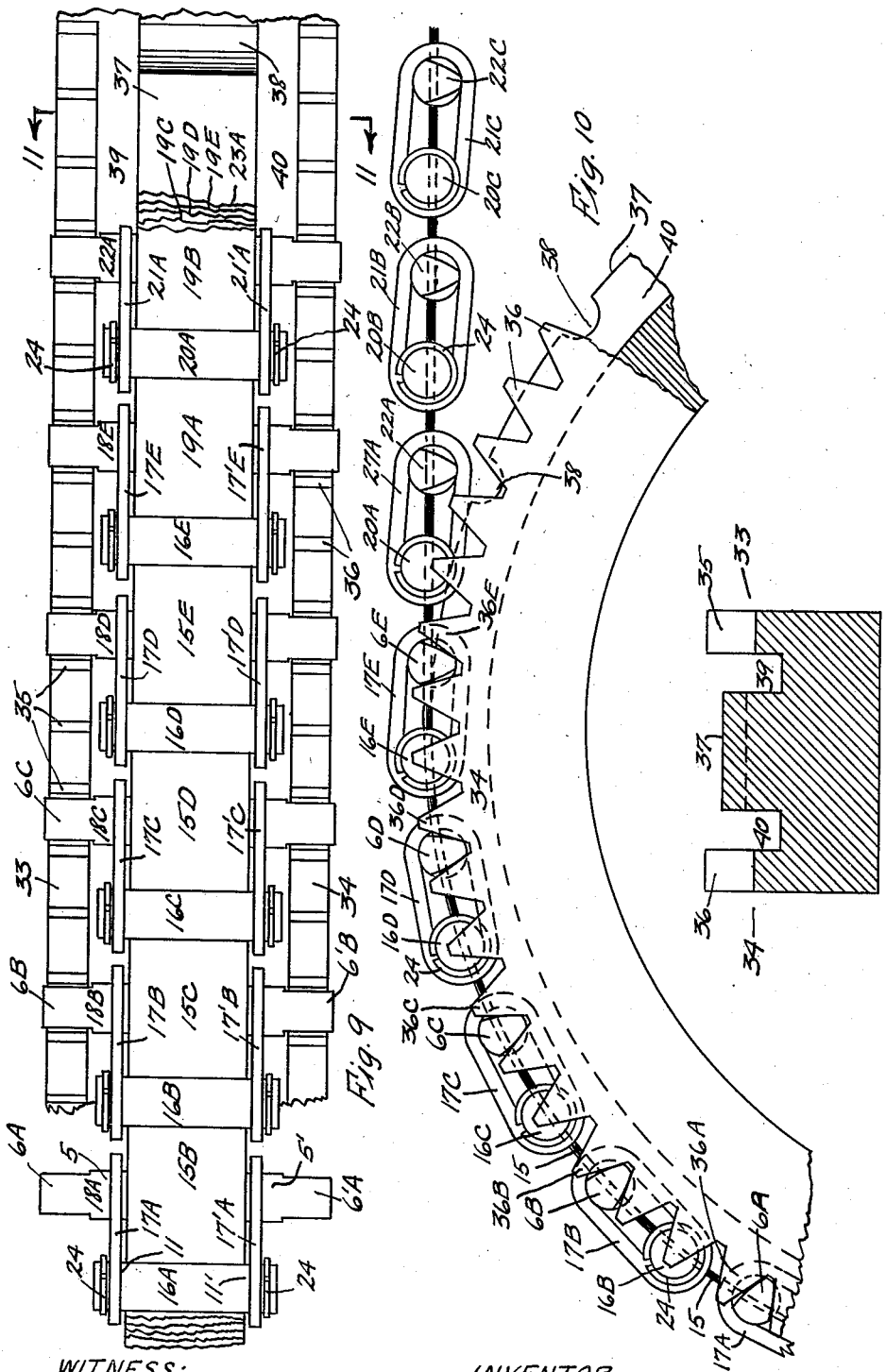

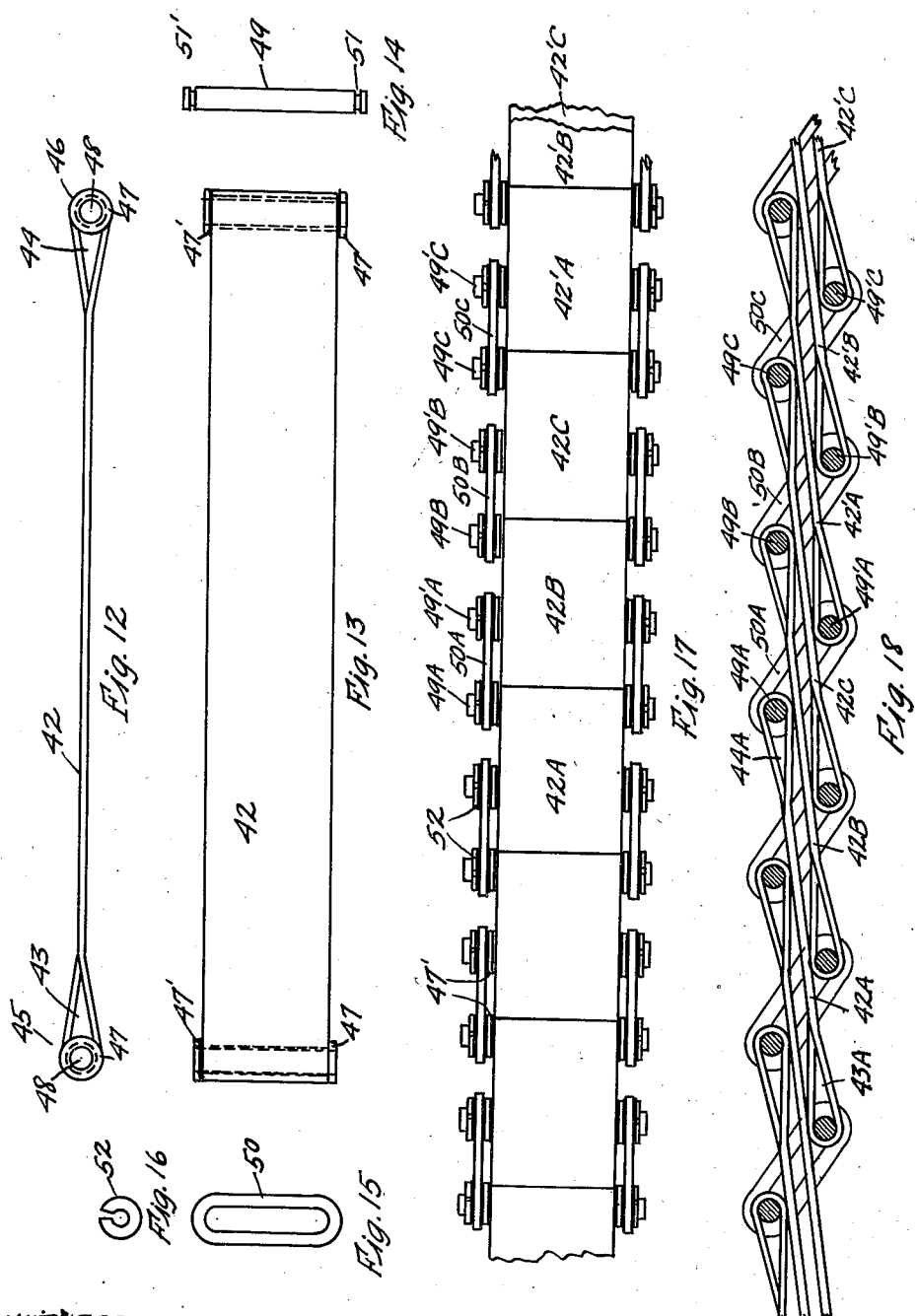

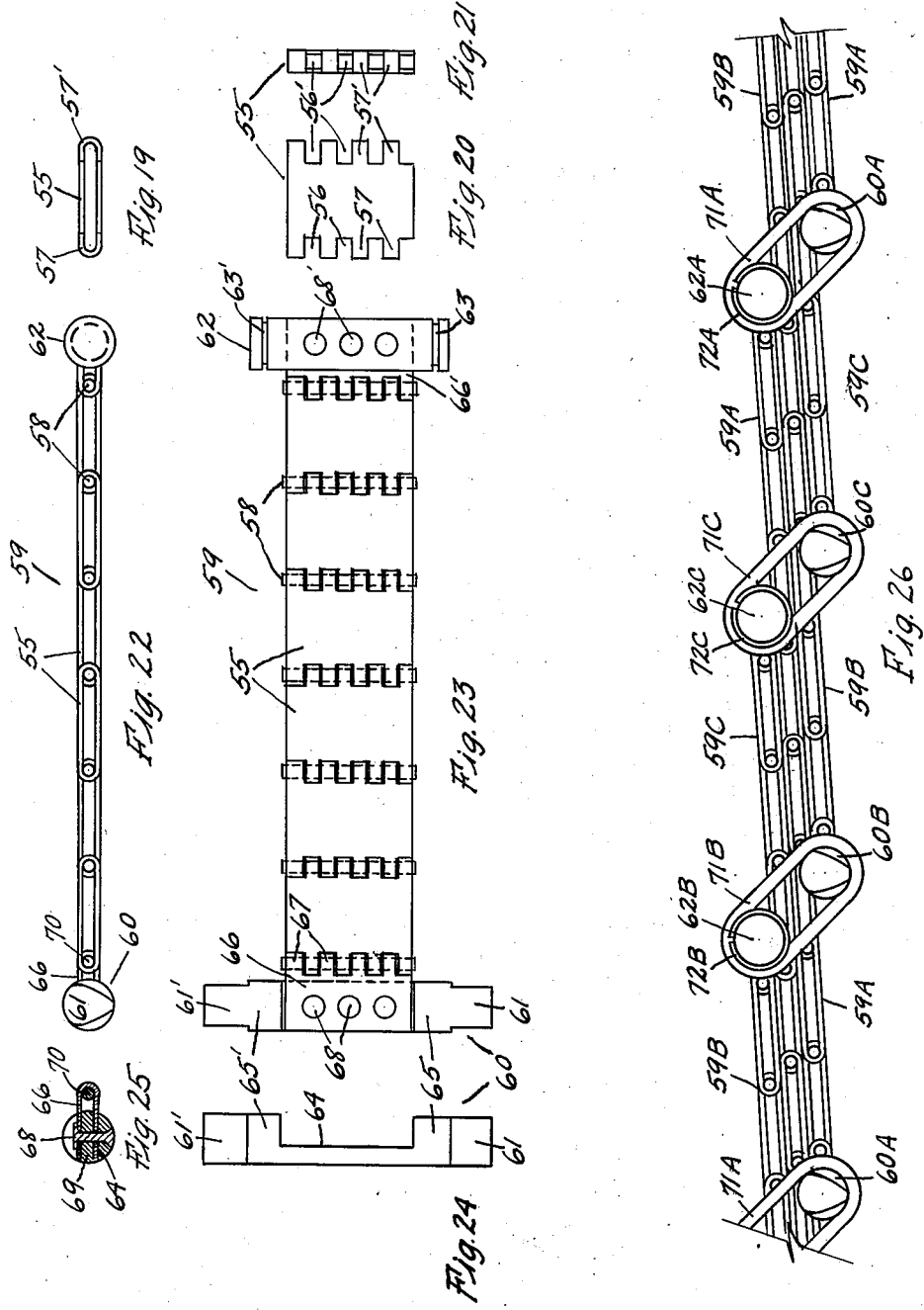

2,097,534

UNITED STATES PATENT OFFICE 2,097,534

MECHANICAL POWER TRANSMISSION

Allen M. Rossman, Wilmette, Ill., assignor to Rossman Engineering Company, Chicago, Ill., a corporation of Illinois Application October 28, 1933, Serial No. 695,626

18 Claims. (Cl. 74—245)

The present invention relates generally to mechanical power transmission and particularly to a flexible band transmission composed of a plurality of plies or laminations in which the total load is distributed among the several laminations.

Mechanical power transmitting devices of the multiple strand type have been known and used for many years. Practically all existing forms of this type of drive employ a plurality of strands, belts or ropes arranged side by side in parallel on the pulley. This type of drive has the advantage over a single strand drive of equal tensile strength that pulleys of smaller diameter can be employed without inviting failure by fatigue of the strand due to flexure in going around the pulleys. The disadvantage of this type, however, lies in the greater pulley width required.

In the present invention, advantage is taken of the multiple strand principle, but the compactness of the single strand transmission is retained by assembling a flexible drive medium of a plurality of plies or laminations, each of which is free to flex independently and providing each ply with means for engaging the wheel or pulley.

This invention greatly broadens the field of the metal belt which, in the single ply form, is limited to a narrow range of practical application by two conflicting stresses. If the thickness of the belt be too great, the outer fibres will be overstressed while bending around the wheel; if the thickness be too small, the load carried by the belt must be limited to a comparatively low value. The present invention contemplates building up a metal belt with a plurality of metal plies, each of which is thin enough to withstand the bending around the wheel with enough margin in reserve to allow for the addition of a reasonable amount of tension load. It is conceivable that any reasonable load can be driven by this means if enough laminations are used and if the total load is divided substantially equally among the laminations.

Each lamination engages the wheel independently by means of teeth which are fastened to the respective laminations. These teeth engage a pair of sprockets on each wheel.

While a nest of non-interlaced concentric laminations would accomplish this purpose, it would be difficult to construct such a belt because each lamination would have a different length but must be accurately made so that the load would divide equally. Moreover, with concentric laminations, the driving teeth would intervene between each two adjacent plies and would result not only in a very thick belt, if a large number of laminations were used, but localized wear on each ply would be caused by the teeth of the adjacent ply bearing upon it.

In the present invention, the plies are built up of a number of unit pieces, all alike and of the same dimensions. The unit strips lie together like the leaves of a book while the teeth and connecting links are on the outside of the pile of laminations.

I will now describe the construction of power transmitting devices embodying the principles of this invention, reference being made to the following drawings:

Figure 1 is a plan of a unit metal strip assembled with cross-bars.

Figure 2 is an elevation of the longer cross bar carrying sprocket engaging teeth.

Figure 3 is an elevation of the shorter cross bar.

Figure 4 is a view of the edge of the unit strip.

Figure 5 is a section of the unit strip taken along line 5—5 in Figure 1.

Figure 6 is an assembly of a number of unit strips taken in section as in Figure 5.

Figure 7 is an edge view of a longer unit having more than one pair of teeth.

Figure 8 is a retaining washer.

Figure 9 is a developed plan of a belt engaging a sprocket wheel.

Figure 10 is a partial elevation of a belt engaging a sprocket wheel.

Figure 11 is a transverse section of the rim of a sprocket wheel as taken along a line 11—11 in Figure 9.

Figure 12 is an edge view of a unit strip of fabric or the like.

Figure 13 is a plan of the unit strip shown in Figure 12.

Figure 14 is a pin used in linking the fabric units together.

Figure 15 is a link.

Figure 16 is a retaining washer.

Figure 17 is a partial plan of an assembled fabric belt.

Figure 18 is a partial elevation of an assembled fabric belt.

Figure 19 is an edge view of a unit piece used in assembling a flexible strip of a third embodiment.

Figure 20 is a plan of the unit piece shown in Figure 19.

Figure 21 is an end view of the same unit piece.

Figure 22 is an edge view of a unit strip assembled from unit pieces as shown in Figures 19 to 21.

Figure 23 is a plan of the strip shown in Figure 22.

Figure 24 is a side view of the toothed cross bar.

Figure 25 is a transverse section through a cross bar and connecting piece.

Figure 26 is an elevation of three ply belt of the third embodiment.

Figure 11A:
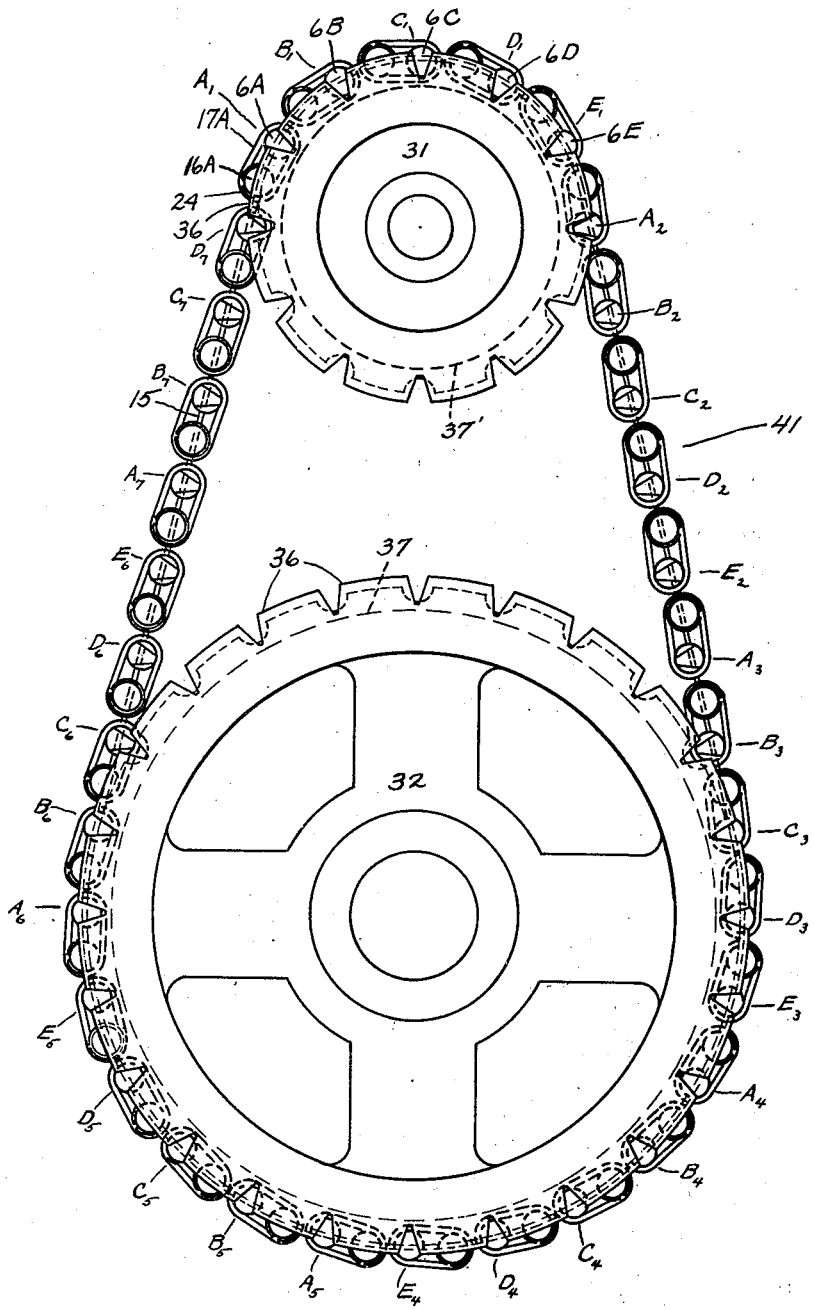
Figure 11A is an elevation of a belt engaging a pair of pulleys or sprockets.

Figures 1 to 5 show the details of a single unit comprising a metal strip 1 at each end of which is fastened a cross bar 18, 16. One of the bars 18, a side view of which is shown in Figure 2, comprises a middle portion 4 of substantially semi-circular cross section, adjacent portions 5, 5' of circular cross section, and end portions 6, 6' which act as teeth for engaging the sprocket.

The teeth 6 are of substantially V-shaped cross section in any of the well known forms which result in quiet operation.

The middle portion 4 has a recessed surface 7 which is flat or slightly rounded, to which the metal strip 1 is fastened. This surface is recessed to reduce the tendency to set up an overturning moment. The preferred method of fixing the strip to the bar is by welding along a surface 8 down the center of the flat surface 7. A new welding process under control of electronic tubes permits the use of high strength carbon or alloy steels in the main strip 1. The bar is located back from the end of the strip, a short length of strip 9 being allowed to lap over the bar for reasons given later.

The other bar 16, shown in Figure 3, comprises a middle portion 10 of semi-circular cross section, adjacent portions 11, 11' of circular cross section, and grooves 12, 12' near the two ends of the bar 16.

The flat or slightly curved face 13 of the middle portion 10 lies substantially in a plane with the central axis of the bar 16. To this face is welded or otherwise fixed the metal strip 1 in a manner similar to that used in fixing the toothed bar 18 except that this bar 16 is welded to the opposite side of the strip.

Figure 6 illustrates the method of assembling these strips into a metal belt. This drawing is a longitudinal cross section through a short length of belt, in which the laminations are separated to make them easier to trace out. The unit pieces are stacked in a pile but displaced longitudinally as shown, with the toothed bar members 18 on the bottom and the grooved bar members 16 on top or vice versa. The upper or grooved bar 16 of each strip is then joined to the lower or toothed bar 18 of an adjoining strip by means of links 17 which extend along the sides of the stack of laminations. In this way, each lamination of the belt extends from the bottom to the top of the stack and is connected back to another lamination at the bottom.

A number of series connected laminations forming one complete convolution around the belt will hereafter be termed a strand. The belt illustrated has five strands, each strand bearing a common reference letter, A, B, C, D and E, respectively.

For example, the upper strip 15A at the left of the length of belt has a connection bar 16A. This bar is coupled to the toothed bar 18A at the bottom of the stack by means of links 17A which bear on the cylindrical extensions 11, 11' at each end of the grooved bar and the cylindrical extensions 5, 5' at each end of the toothed bar. The links are held in place by a split spring retaining washer 24, shown in Figure 8. This washer fits into the groove 12 on the grooved bar and is put in place by springing it apart and slipping it over the end of the bar. A retaining washer is not necessary on the long bar as its length prevents the link from slipping off.

Tracing the strand further, the toothed bar 18A is fastened to a strip 19A which extends up through the pile to the upper grooved bar 20A which is linked in turn to the next toothed bar 22A by the link 21A. The toothed bar 22A is fastened to the next strip 23A which extends out of the belt section shown.

Similarly, the second strand 15B begins at the left as the second lamination in the stack, and progresses to the top bar 16B, which is linked to the bottom bar 18B by a link 17B, thence upward once more by the strip 19B, etc.

In a similar manner, the other laminations C, D, E progress in turn from the bottom to the top of the stack from which they are again linked to the bottom.

The purpose of the protruding end 9 of the metal strip can be seen in Figure 6. When the belt is bent around the pulley, this extension forms a protection to the adjacent strip against wear from the edge 14 of the semicircular portion 4 of the bar. This condition is further helped by slightly rounding the face 7 of the bar.

Varying the total number of unit pieces in the belt gives various structural combinations, which range from one in which the several strands are connected in series, to one in which each strand is an independent ring closed on itself. For example, if the total number of unit pieces in the belt is an even multiple of the number of strands, there will be a plurality of unitary interwoven belts, each closed on itself and all operating in multiple. However, if the total number of unit pieces is one more or less than an even multiple of the number of strands, the result will be a single endless chain of unit pieces, closed on itself, having several convolutions or loops. In either case, the strands act independently, that is, the load reaction is transmitted from the sprocket to each strand directly without passing through any other strand. Apparently, one combination will work as well as another. In any combination, the breakage of one piece will cause the load of the broken strand to be re-distributed equally among the remaining strands and will generally not cause a shut-down as the broken ply is so held in position that it will not get in the way of and interfere with the normal operation of the other plies.

In Figure 6 each of the unit strips is comparatively short, with the result that the links 17A to 17E, inclusive, are spaced at close intervals. This is not always the case, however, as each strip can be made much longer as shown in Figure 7. In this case the strip 25 is indicated as being comparatively long and has several toothed bars 26, 27, 28 fastened at intervals along the strip in addition to the toothed bar 29 at the end and the grooved bar 30 at the other end. In this way, belts of few laminations for use on comparatively large wheels need not have a great number of links. The number of links necessary are determined by the number of plies and the length of contact on the circumference of the wheels as each strand must have at least one tooth engaged with each wheel at all times.

Figures 9 to 11 show an assembled belt in engagement with a wheel and also the type of sprocket wheel used in this connection.

Figure 9 is a plan showing the assembled belt with the toothed bars 18 beneath the strips 15 and the grooved bars 16 above the strips 15 connected together along the edges of the strips by the links 17 which hook over the bars and bear on the circular extensions 5, 11 and are held in place by the split spring washers 24 in the grooves 12 of the upper bar 16.

The teeth 6, 6' of the bars 18 engage sprockets 33, 34 which have teeth 35, 36 respectively. The belt lies on a wheel rim 37 in which are recesses 38 in which lie the lower bars 18, thereby allowing the belt strips to bear flat on the rim 37. Clearance channels 39, 40 are provided between the sprockets 33, 34 and the rim 37 for the links 17 and spring washers 24.

Figure 11 shows a transverse section through one rim of the sprocket wheel, showing the rim surface 37 on which the belt bears, on each side of which are the sprockets 33, 34 with separations 39, 40 to provide clearance for the links and washers.

In Figure 10, which is an elevation of a portion of sprocket wheel and belt, broken away to show the rim 37, the method of distributing the load among the teeth is evident. In this drawing the laminations 15 of the belt are shown together in normal position. Reference numerals are the same as in Figure 6. Consider the wheel to be driven in a clockwise direction by the belt which is pulled to the right. The tensions in the laminations, of which there are assumed to be five, as in Figure 6, are equal; therefore, the forces acting against the teeth 6A, 6B, 6C, 6D and 6E are also equal. Hence, the total pull on the belt is distributed among the five sprocket teeth 36A, 36B, 36C, 36D, 36E shown and also those on the opposite side 36'A, etc. (not shown in Figure 10).

This type of belt has one characteristic which makes it unique among mechanical power transmitting devices. With ordinary belts of leather, fabric or metal, the maximum pressure on the faces of the pulleys is on that portion of the face which is adjacent to the line of tangency of the tight side of the belt against the pulley face. The pressure drops off rapidly from this line to the line of tangency on the loose side of the belt. In chain drives, the teeth under maximum stress are those closest to the tight side of the chain and tooth pressures drop off rapidly as the slack side of the chain is approached. In gears, the stress is concentrated on the 1, 2 or 3 teeth of each gear which are in contact. In the laminated metal belt disclosed in this invention, if the number of pairs of sprocket teeth in contact with corresponding teeth on the belt be made equal to the number of strands of the belt, each pair of teeth will carry an equal share of the total load. Any additional number of pairs of sprocket teeth which may make simultaneous engagement with corresponding pairs of teeth on the belt, will tend to relieve one or more other pairs of a part of their load.

It can be shown mathematically that in a laminated steel belt of this type the design having the fewest number of laminations for a given load and given sprocket diameter is one in which the stress due to bending is equal to half the total allowable unit stress, leaving the other half for useful pull on the belt. The stress due to bending is equal to the ratio of the thickness of a single lamination to the wheel diameter multiplied by the modulus of elasticity. The great importance of this and other characteristics of this form of drive in permitting the range of power transmission by belt drive to be extended far beyond its present limits without developing stresses in excess of safe limiting values in the laminations, links, or teeth can best be appreciated by solving an actual problem involving an application of the belt. The following is an example:

What is the maximum power that can be transmitted by a laminated steel belt 2" wide, operating on a wheel 18" in diameter at 870 R. P. M. (4100 ft./min. belt speed)?

Assuming that the belt is made if high strength steel (150,000–200,000 lbs./sq. in. ultimate), let the total maximum allowable stress be 75,000 lbs./sq. in. The most economical thickness of lamination is one in which the stress due to bending is one-half the total or $$\frac{75000}{2} = 30,000,000 \frac{t}{18}$$

$t = 22\frac{1}{2}$ mils—thickness of lamination.

The maximum useful pull on a strip 2 inches wide is $$\frac{75000}{2} \times 2 \times .0225 = 1690 \text{ lbs.}$$

per lamination or 845 lbs. per tooth.

An 18" wheel would allow space for at least 12 pairs of teeth in engagement at a time, thereby permitting the use of 12 strands or 20,300 lbs. total belt pull, which, at 4100 ft./min. is equal to 2500 H. P. on a belt 2" wide and .27" thick. A load of 500 H. P. could therefore be easily carried on such a belt having a factor of safety of 5.

Any wear which may occur between the sprocket teeth 36 and the teeth 6 on the belt will tend to equalize rather than localize the loads on the individual plies.

Belt elongation due to wear at the links will be much less than in a chain drive. Based on the same tooth pitch for the conventional chain and the belt and the same amount of wear per joint in each, the elongation of the belt will be equivalent to the elongation of the chain divided by the number of plies in the belt. This wear can be taken care of by designing the shape of the contacting surfaces to permit a slight amount of radial adjustment.

Figure 11A shows a driven sprocket wheel 32 and a smaller driving sprocket wheel 31 which are connected or coupled together by a belt 41 of the class described. For purposes of analysis, the connecting links are designated by letters A, B, C, D and E, each letter denoting a separate strand or convolution. The various component units of each strand are designated by sub-numerals. Hence, Figure 11A illustrates a five-ply belt, or one having five strands or convolutions.

Starting with the link $A_1$ engaging the driving sprocket 31 by means of the tooth 6A, the strand again engages the sprocket 31 at the link $A_2$ from whence the unit pieces in the strand are serially connected by the links $A_3$, $A_4$, $A_5$, $A_6$, and $A_7$, of which $A_4$, $A_5$ and $A_6$ engage the driven sprocket 32. That is to say, in a five-ply belt, each strand is fastened to every fifth connecting link, at which point sprocket-engageable teeth are provided. From the link $A_7$ the fifth link in progression is $B_1$, to which the lamination from the link $A_7$ is connected because of the fact that link $E_7$ is omitted. If there were a link $E_7$ in the belt, then line $A_7$ would connect to link $A_1$ and the strand or convolution A would close on itself. However, as there is one less unit piece than an even multiple of the number of strands, each strand or convolution is connected in series to the adjacent one. The last convolution therefore connects from the line E₆ back to the first-mentioned link A₁. Hence the belt comprises one endless chain of links having five convolutions.

From the foregoing explanation, it is clear that each strand has at least one independent engagement with the small wheel 31 and three engagements with the large wheel 32, illustrating the principle by which the total load on the belt is distributed among the several strands from independent portions of the circumference of one wheel to independent portions of the circumference of the other wheel.

Figures 12 to 18 inclusive illustrate a second embodiment of the principles of the present invention. In this case, the unit piece shown in Figures 12 and 13 is made of a fabric strip 42 having a loop 43, 44 in each end. The fabric can be of rubber or cord construction, or a combination of both. The strip can also be of metal on which loops have been provided. In short, this embodiment is similar to the preceding one as described except that the method of fastening the strip to the bars is adaptable to a wider range of materials. As illustrated however in Figures 12 to 18, a belt of the friction type, without sprockets, is indicated, although this form is also adaptable to the tooth and sprocket type.

In each of the loops 43, 44 is inserted a spool 45, 46, each of which have flanges 47, 47' to retain the strip and a hole 48 through the center for the coupling pin 49. The coupling pin 49 fits into the hole 48 and extends beyond the ends of the spool far enough to provide bearing for the links 50. Figure 15 shows such a link. A groove 51, 51' is provided in each end of the pin 49 to form a means for retaining the links by means of a split spring washer 52 which is shown in Figure 16. The washer snaps into the groove and thereby prevents the link from coming off the pin.

Figures 17 and 18 show an assembly of this form of belt. In this case the belt has but three strands. One strand 42A can be traced from its bottom loop 43A near the left of the section toward the right to the top loop 44A which is then linked to the next bottom loop 43'A by means of pins 49A, 49'A and links 50A. Similarly, the second strand can be traced from the adjacent strip 42B through a pin 49B, a link 50B, another pin 49'B to the next strip 42'B. In a similar manner the third strand can be traced by the reference numerals containing the letter C.

The belt bears on a smooth faced pulley and drives by friction in a similar manner to that of a conventional belt.

If the unit pieces be connected all in series to form a single continuous endless structure, each ply will be held to a definite position in relation to the other plies. This system of connecting is to be preferred for this form of the invention in which there are no tooth engagements to keep the plies in definite space relations one to another.

The materials of which the belt and pulleys are constructed for a friction drive would be selected to provide a satisfactory coefficient of friction. For example, a steel pulley could be used with a rubber composition belt while a rubber or cork faced pulley could be used with a steel belt.

Figures 19 to 26 inclusive illustrate a third embodiment of the principles of this invention. The principal feature in this case is that the flexible member, instead of being a single pliable strip, is a chain of comparatively rigid units. In other words, flexibility is obtained by joints instead of by a pliable material. The distribution of the total tension in the belt equally among a plurality of teeth in the sprocket however is accomplished in a manner similar to the foregoing description.

Figures 19 to 21 inclusive show the details of a single unit piece 55 from which a strip is assembled. The piece can be cut from a seamless metal tube and flattened as shown in Figure 19. Notches 56, 56' are cut in each of the rounded ends leaving loops 57 between the notches. The notches 56 in one end can be in line with those in the other end as shown, or they can be staggered. Pieces as shown can be placed together, every alternate piece reversed, with the loops and notches interlacing so that a pin 58 can be inserted to hold two pieces together as shown in Figure 22.

A strip 59 is made up of several unit pieces 55 pinned together and at each end of the strip are fastened cross bars, one bar 60 having sprocket-engaging teeth 61, 61', and the other bar 62 having grooves 63, 63' which serve the same purpose as those described in connection with Figure 1. Figure 24 shows a side view of the toothed bar 60, which consists of a middle portion having a flat face 64 recessed in the bar, circular portions 65, 65' on which bear the connecting links, and teeth 61, 61' on the two ends.

The strip 59 is fastened to the bar 60 by means of a U-shaped connecting piece 66 shown in cross section in Figure 25. This piece has loops 67 and is essentially half of a unit piece 55. It is fastened to the flat face 64 of the bar by means of rivets 68 or other suitable means. A filter piece 69 is interposed between the leaves of the connecting piece 66 as a spacer. The connecting piece fits together with the end of the strip and is fastened by a pin 70.

The bar 60 is arranged so that the tooth contact on the sprocket and the axis of the pin 70 are substantially in one plane to avoid any tendency to overturn.

The grooved bar 62 is connected to the belt in the same manner as described for the toothed bar 60 and as it is otherwise constructed similar to the bar 16 shown in Figure 3, a detailed description will not be repeated.

A short length of assembled belt of this third form is shown in Figure 26. A three strand belt is illustrated, the reference numerals of the various components including the letters A, B or C respectively to identify the strands, which can be traced out in the same manner as described heretofore. For example, one strand A begins at the left with a link 71A connected to the toothed bar 60A which is connected by means of a strip 59A of unit pieces 55 to the grooved bar 62A. This bar is on top of the belt and is connected back to the toothed bar 61A at the bottom by a link 71A which is held on the grooved bar by means of a spring washer 72A which fits in the groove 63. The other two strands B, C can be traced in a similar manner.

While in this disclosure I have described three forms of my invention and one set of details for each form, I do not desire to be limited in applying my invention to the precise forms, embodiments and details shown. In the claims which follow I have defined what I consider new in the art and what I desire to have protected.

I claim:

1. A system of mechanical power transmission consisting of a driving wheel, a driven wheel, and a flexible endless belt connecting said wheels, said belt comprising a plurality of stacked laminations, means for interconnecting said laminations to provide a plurality of strands, and means for independently engaging each of said strands with both of said wheels.

2. In a laminated belt, an assembly of unit strips laid one on another, each strip being displaced longitudinally with respect to its adjacent strip, and means, disposed beside said assembly, for joining said strips to form a predetermined number of continuous endless strands.

3. A belt of the class described, consisting of an assembly of unit strips, each of said unit strips comprising a flexible band, and a cross bar fixed to each end of said band, each of said cross bars comprising a middle portion having a recessed substantially flat surface to which said flexible band is fastened, and one of said cross bars having extensions carrying sprocket-engageable teeth, said teeth projecting laterally from each side of the belt.

4. A belt of the class described consisting of an assembly of unit strips, each of said unit strips comprising a fabric band having a loop in each end, a hollow reinforcing spool in each of said loops, a coupling pin inserted through each of said spools, and links co-operative with each pin for coupling said unit strips together.

5. In a laminated belt of the class described, a unit strip comprising an assembly of rigid links hinged together to form a flexible band, a cross bar having sprocket-engageable teeth, and another cross bar, said cross bars being fastened to the two ends of said band respectively.

6. In a system of power transmission including a driving belt said belt comprising a plurality of flexible laminations each lamination having laterally extending sprocket-engaging cross bars fixed thereto, a driving wheel comprising a central rim for supporting said laminations and a pair of sprockets, one on each side of said rim, for engaging said cross bars.

7. In combination, a driving sprocket, a driven sprocket, and a laminated belt connecting said sprockets, said belt consisting of a plurality of interwoven convolutions, and a plurality of sprocket engageable teeth fixed to each of said convolutions, whereby each of said convolutions individually engages both of said sprockets at all times during normal operation.

8. A mechanical power transmitting system, including a pair of sprockets, a laminated metal belt comprising a plurality of multiple-driving strands stacked one on another, and means comprising sprocket engageable teeth on each strand of said belt for independently engaging both of the sprockets with each of the strands simultaneously.

9. A laminated power transmitting belt comprising an assembly of strips laid one on another so that a row of overlapping ends appears on each side of said assembly, and means disposed along the edges of the strips in the assembly for connecting each of said overlapping ends on one side with a respective end of another strip on the other side of said assembly.

10. A laminated power transmitting belt comprising an assembly of relatively thin metallic strips laid one on another but displaced longitudinally with respect to each other, whereby a row of overlapping ends appears on each side of said assembly, and means, disposed entirely without the assembly of strips, for connecting each of said overlapping ends on one side with a respective end appearing on the other side of said assembly.

11. A belt of the class described, consisting of an assembly of unit strips, each of said unit strips comprising a flexible band and a cross bar fixed to each end of said band, each of said cross bars comprising a middle portion, having a recessed substantially flat surface to which surface said flexible band is fastened, and end portions providing cylindrical bearing surfaces for connecting links.

12. A belt of the class described, consisting of an assembly of unit strips, each of said unit strips comprising a flexible band and a cross bar fixed to each end of said band, at least one of said cross bars comprising a middle portion, having a recessed substantially flat surface to which said band is fastened, and cylindrical end portions carrying sprocket-engageable teeth, said flat surface being disposed substantially in a plane with the longitudinal axis of said end portions.

13. In a laminated belt, a stack of unit strips laid one on another, each strip being of a length less than the peripheral length of said belt and displaced longitudinally with respect to its adjacent strip, and means for interconnecting certain of said strips to form a plurality of independent interwoven strands, said strands being slidable relative to one another.

14. A laminated belt comprising in combination, a stack of unit strips disposed in longitudinally overlapping arrangement, and means for connecting certain of said strips in series to provide a plurality of interwoven convolutions, each of said convolutions being free to slide peripherally relative to its adjacent convolution.

15. In a laminated power transmitting belt, a stack of laminations disposed in longitudinally overlapping arrangement, and means for serially connecting each of said strips to another of said strips separated therefrom by a predetermined number of intervening strips, said intervening strips being slidable longitudinally relative to said connected strips and to each other.

16. A power transmitting belt comprising a plurality of overlapping stacked unit strips of equal lengths, said length being less than the peripheral length of said belt, and means for interconnecting said unit strips in series to provide an endless chain of strips, said chain having a plurality of independent interwoven convolutions.

17. In combination, a driving wheel, a driven wheel, and a belt connecting said wheels, said belt comprising a stack of laminations disposed in longitudinally overlapping arrangement, means for interconnecting said laminations to form a plurality of multiple-driving strands, and means for making an independent engagement between each of said strands with both of said wheels simultaneously.

18. In combination, a pair of wheels, a belt comprising a plurality of unit strips laid one on another in overlapping arrangement, means for interconnecting said strips to form a plurality of strands, and means for separately engaging each strand with independent portions of the circumferences of both of said wheels simultaneously.

ALLEN M. ROSSMAN.